Feb. 11, 1947.  J. L. KIMBALL  2,415,745
AUTOMATIC ADJUSTMENT MEANS FOR REGULATORS
Filed Oct. 8, 1943  2 Sheets-Sheet 1
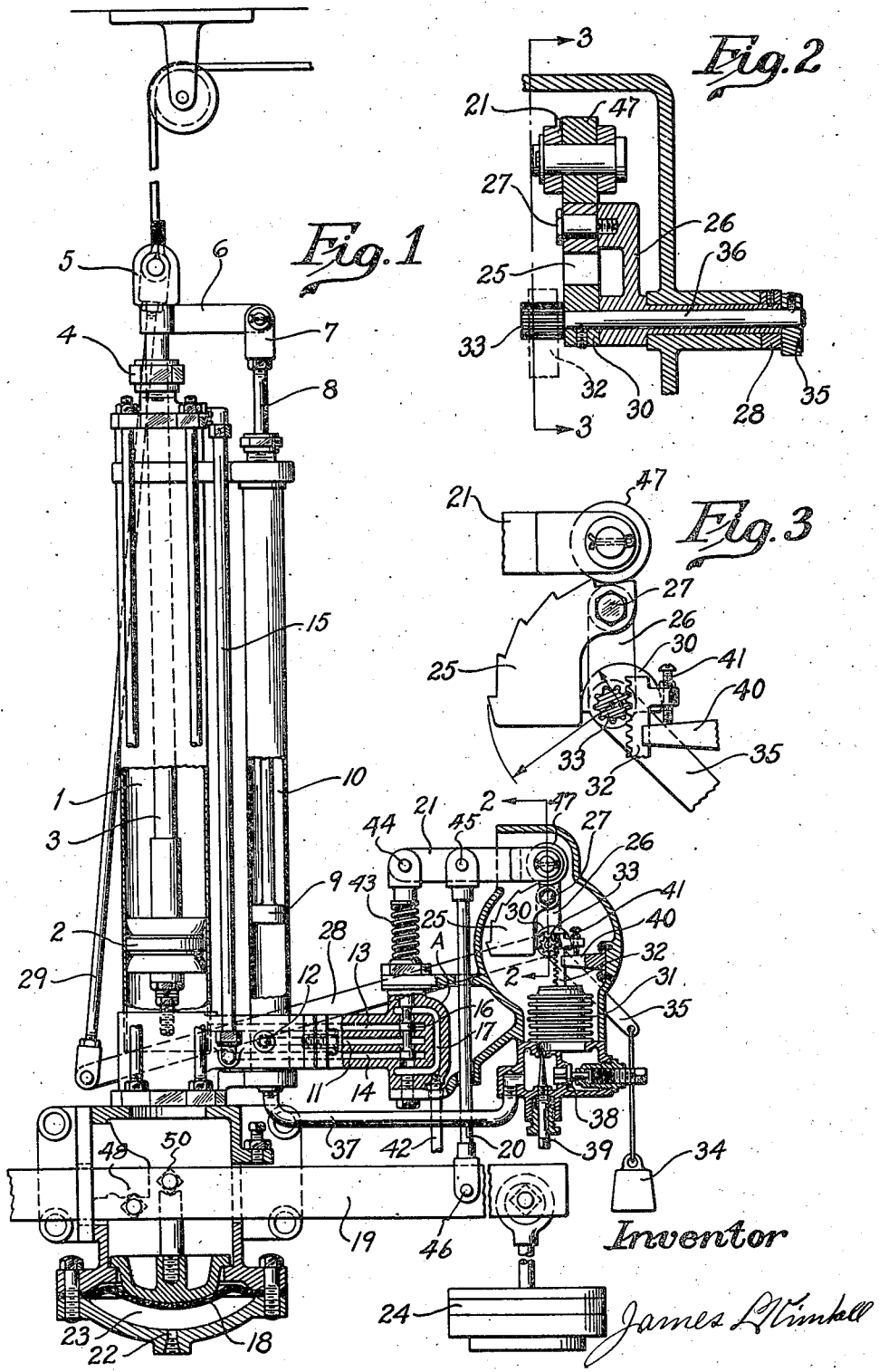
Inventor
James L. Kimball Feb. 11, 1947. J. L. KIMBALL 2,415,745
AUTOMATIC ADJUSTMENT MEANS FOR REGULATORS
Filed Oct. 8, 1943 2 Sheets-Sheet 2
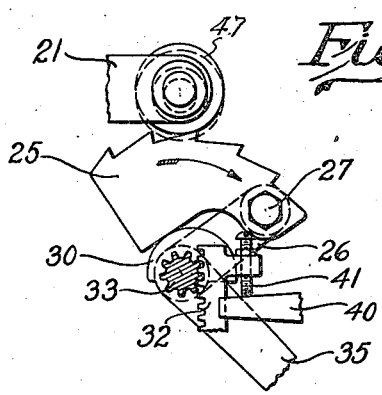
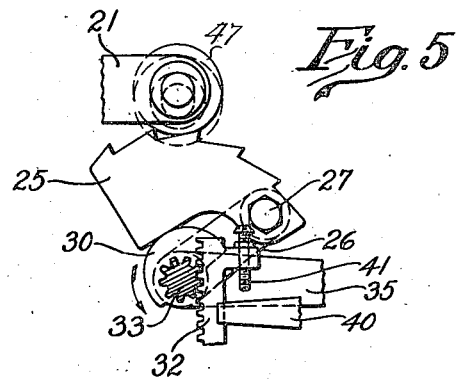
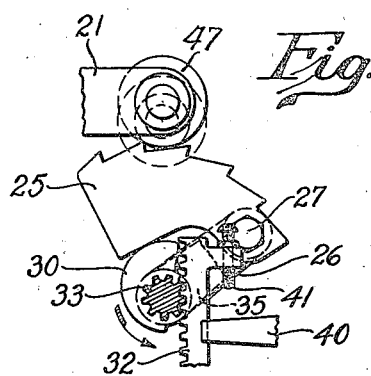
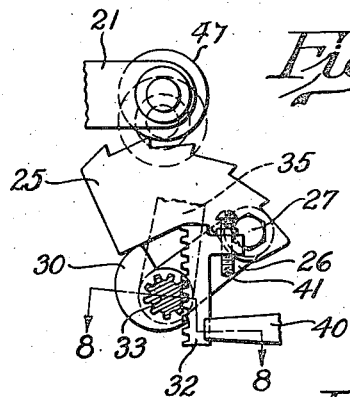
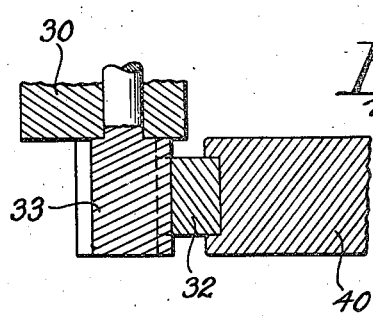
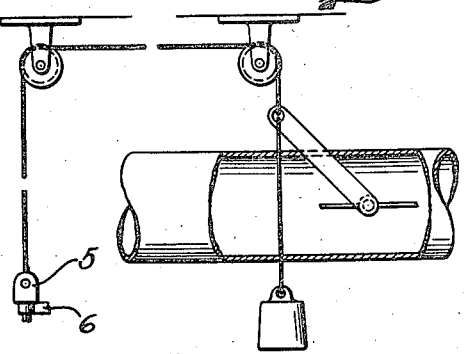
Inventor
James L. Kimball Patented Feb. 11, 1947

2,415,745

UNITED STATES PATENT OFFICE 2,415,745

AUTOMATIC ADJUSTMENT MEANS FOR REGULATORS

James L. Kimball, Danvers, Mass., assignor to Ruggles-Klingemann Mfg. Co., Salem, Mass.

Application October 8, 1943, Serial No. 505,574

9 Claims. (Cl. 121—41)

This invention relates to improvements in automatic regulators, of the relay type, having a follow-up method of compensated control. Such regulators are commonly used in the control of variables; for example, variations in either a pressure or temperature system.

The principal object of the invention is in providing governing means whereby the follow-up is automatically adjusted to a wider range, effecting a wider proportional characteristic to the system under control, upon the occurrence of sustained hunting action.

In the sustained hunting cycle the regulator travels an equal distance each side of an equilibrium condition; and the movement becomes more rapid and extended the greater the system under control becomes unstable and vice-versa, less and less rapid and extended as the range of operation is increased, until the hunting is scarcely noticeable because of its slowness.

On sustained hunting action the operation of pilot control valve will be much more rapid as it swings from one side to the other of its neutral position, than what the power motor can follow, consequently the amount of return motion of the follow-up will not be sufficient to keep the pilot control element in synchronous relation to that of the power motor. In other words, while the power motor speed will be much more rapid because of the wider opening of the pilot valve than under normal operation, yet it will lag the operation of the pilot control to an extent that a normal return motion will be ineffective in preventing hunting. It is therefore obvious that on sustained hunting action the remedy is to adjust the follow-up to a more rapid return motion. The disturbance in the process under control may be only momentary but the result of such disturbance, due to time lag and inertia effect may cause the regulator to hunt indefinitely unless correction by some effective snubbing action such as a more rapid return motion of the follow-up, is applied to the pilot control.

My invention provides means whereby this adjustment is accomplished automatically at a predetermined speed of the regulator which speed corresponds to that of sustained hunting action.

A preferred embodiment of the invention for adjusting the follow-up comprises of: a fluid displacement device operated from the regulator, which displaces fluid only at a given predetermined speed of the regulator; and in providing means whereby the displaced fluid adjusts the follow-up to a wider operating range. With the above and other objects in view, the invention consists of novel improvements in regulators, a preferred embodiment of which is hereinafter described, illustrated in the accompanying drawings, and defined in the appended claims.

Referring to the drawings, a specific embodiment of the invention is shown in a vertical elevation in Fig. 1, the operating elements which comprise the novel features being shown in section.

Fig. 2 is a section taken on line 2—2 of Fig. 1 showing two cams, namely, the follow-up step cam and the follow-up adjustment cam, both of which co-act in governing the operation of a pilot control element.

Fig. 3 shows a vertical section of the parts shown on line 3—3 of Fig 2.

Fig. 4 shows the follow-up stepped cam having been rotated approximately 45° by the operation of the regulator, the adjusting cam remaining at rest.

Fig. 5 shows the follow-up adjusting cam commencing to turn, increasing the follow-up effect of the stepped cam.

Fig. 6 shows a further increase in adjustment of the follow-up cam.

Fig. 7 shows a maximum adjustment of the follow-up cam.

Fig. 8 is a section of a gear rack and gear pinion which operates the adjustment cam.

Fig. 9 shows pressure controlling means operated by the regulator.

Referring now to Fig. 1, a cylinder 1 having a piston 2, piston rod 3, and stuffing box 4 constitutes a power motor for operating a condition controlling device shown in Fig. 9. At the upper end of piston rod 3 is a connecting member 5 which provides means for connecting a cable or other means for operating the condition regulating means.

This connecting member 5 has an arm 6 pivotally connected to 7 mounted on piston rod 8. This piston rod 8 operates a loosely fitted piston 9 in cylinder 10, the arrangement being such that the piston 9 is reciprocated by up and down motion of piston 2 of the power motor. Cylinder 10 contains a fluid and the arrangement constitutes a fluid displacement device for adjusting the follow-up of the regulator as will be hereinafter described.

A pilot control element A is of the conventional form for operating power motors of the hydraulic type and the specific construction and operation will be understood from the following description.

As shown in Fig. 1 the pilot controls a source of fluid pressure for operating the power motor in either one or the other direction. The inlet for fluid pressure being through port 11 the pipe connection for supplying fluid pressure to port 11 being on the base of cylinder 1 at 12. Port 13 leads to the bottom of cylinder 1 under piston 2 and port 14 leads to the top of cylinder 11 by way of pipe connection 15. Spool valve 16 controls the admission and exhaust of fluid pressure to cause piston 2 of the power motor to operate in either an upward or downward direction. On an upward movement of spool valve 16 pressure is admitted to the under side of piston 2 and the fluid above the piston is exhausted through pipe 15, port 14 to passage 17 and then to the atmosphere through pipe connection 42. On a downward movement of valve 16 a reversal of operation takes place, fluid pressure being admitted to the top of cylinder 1 and the fluid below piston 2 being exhausted through port 13 and to passage 17 thence to the atmosphere at connection 42.

In the specific embodiment of my invention I have shown a flexible diaphragm 18 for operating the pilot control element and this is effected through weighted lever 19, fulcrumed at 48 and 50, connecting rod 20 and floating lever 21 the pressure on diaphragm 18 being counteracted by weights 24 attached to the right hand end of lever 19, however, other operating means may be employed; for example, a thermostat, bellows, or Bourdon tube without departing from the scope of the invention. On an increase in pressure in chamber 23 pilot valve 16 is moved upward operating piston 2 of the power motor in an upward direction, and as the pressure decreases within chamber 23 the operation is reversed. The connection to the pressure system under control is at 22.

The operation thus far described is essentially no different than found in the prior art. However, it is common practice to equip such regulators with what is commonly referred to as a follow-up. Devices for this purpose may vary in different regulators but all have one common purpose, namely to effect operation of the regulator over a greater or less range, in other words, causing a further change in the controlled condition for a further operation of the power motor.

The follow-up method of control as disclosed in my invention comprises of a follow-up stepped cam 25 superimposed on a follow-up adjusting cam 30. Specifically the stepped cam 25 is pivoted on arm 26 at point 27, this arm 26 is rotated by lever 28 operated by the power motor through rod 29. On an upward movement of piston 2 of the power motor, cam 25 is rotated in the direction shown by the arrow in Fig. 4, but regardless of the direction of operation of piston 2 the movement of cam 25 is always such as to return the spool valve 16 in a direction toward its neutral position. This is accomplished through the rocking of lever 21 on its pivoted connection 45.

A spring 43 is provided which takes up lost motion in pivoted connections 44, 45 and 46 also acting to hold roll 47 firmly in contact with stepped cam 25.

My invention resides chiefly in providing means for automatically adjusting the follow-up to a wider operating range between the limits of operation of the power motor, and incidentally between steps of operation of the power motor, on sustained hunting action of the regulator which I will now describe. A cam 30 is operated, from variations in pressure within a flexible bellows 31, through gear rack 32 and gear pinion 33 to thereby swing stepped cam 25 outward or inward on pivot 27. The return motion, on a drop in pressure within the bellows 31, being effected by a weight 34 attached to arm 35 which transmits motion through shaft 36, pinion 33 to pinion rack 32 (see Figs. 2 and 3). A support 40 and adjustment screw 41 limits the downward movement of the bellows 31.

Variations in pressure within bellows 31 are effected by the operation of piston 9 operating in cylinder 10 in displacing fluid through conduit 37 and past check valve 38. The upward stroke of piston 9 is not effective in displacing fluid, but as more and more of the fluid has a tendency, due to its static head, to pass the piston downward, therefore, the downward stroke of the piston is the effective stroke in displacing fluid on sustained hunting action.

It should be understood that a relatively slow speed of the power motor will be all that is required to take care of normal changes in the condition of the system and under these normal changes the fluid in cylinder 10 will pass the loosely fitted piston 9 without displacing fluid past the spring loaded check valve 38, but at a faster speed of the power motor which is always present with sustained hunting because of the wider opening of the pilot valve parts, all the fluid cannot pass this piston and therefore a pressure is generated in the lower end of the cylinder 10 sufficient to force check valve 38 open and operate bellows 31 to turn cam 30 in a counterclockwise direction, and thereby adjust stepped cam 25 outward to a wider operating characteristic.

This adjustment is effective in causing the power motor to operate over a wider range, in pressure acting on diaphragm 18, and consequently the increased snubbing action reduces the sustained hunting to a degree where it becomes a damped hunting, decreasing with time. As it is not desirable to continue to operate the regulator over a wide pressure range a needle valve 39 is provided for allowing the pressure within the bellows 31 to slowly dissipate itself back through conduit 37 to cylinder 10 as soon as the regulator becomes stable, due to the momentary disturbance of the system under control having passed, and the cam 30 is simultaneously moved in a clockwise direction to return the follow-up stepped cam to its original setting.

The initial follow-up effect of the cam 25 is derived principally from its rotating motion over the periphery of cam 30 and the outward throw of this cam is both increased by its own reciprocal motion and by that of the adjustment of cam 30. In this way, should no sustained hunting action take place, the regulator will be operated at a normal follow-up effect and consequently the pressure held at a minimum drooping effect.

While I have described by invention in relation to pressure control, the advantages of the invention are equally applicable to temperature control, or other conditions requiring regulation. Such regulators are also used for the operation of rheostats and for other control purposes all of which is within the spirit of the invention as set forth in the following claims. It should also be understood that the invention is applicable to electric motor operated regulators as disclosed in my prior Patent No. 2,300,227 of Oct. 27, 1942.

I claim:

1. In stabilizing means for regulators of the class having a power motor and a pilot control element, comprising in combination, means responsive to the condition to be regulated for operating the pilot control to thereby operate the power motor, including a floating lever, a cam for operating said lever, mechanical means operated from the motor for operating the cam, means to adjust said cam including a cylinder, a piston therein operated from the power motor, a fluid pressure motive device operatively connected with the cam, a conduit connecting the cylinder with the motive device, a check valve in said conduit for preventing back flow from the motive device to the cylinder and a manually operated valve for by-passing said check valve.

2. In a stabilizing means for regulators of the class having a power motor and a pilot control element for controlling a source of energy for operating the power motor, means responsive to the condition to be controlled for operating the pilot control element to thereby operate the power motor, a follow-up return means operated from the power motor co-acting with the responsive means in the operation of the pilot control element including a floating lever, a cam for operating said lever, means for adjusting the throw of said cam including a fluid displacement device operated from the power motor, and a fluid motive device connected therewith and operatively connected with said cam adjusting means.

3. In stabilizing means for regulators of the class having a power motor and a pilot control element, comprising in combination, means responsive to the condition to be regulated for operating the pilot control to thereby operate the power motor, a follow-up return means operated from the power motor co-acting with the responsive means in the operation of the pilot control element including a floating lever, a cam for operating said lever, means for adjusting said cam including a fluid displacement device operated from the power motor, a fluid pressure motive device operatively connected with the cam adjusting means, a conduit connecting the motive device with the displacement device, a check valve in said conduit for preventing back flow from the motive device to the displacement device and a manually controlled valve for by-passing fluid past the check valve.

4. In stabilizing means for regulators of the class having a power motor and a pilot control element, comprising in combination, means responsive to the condition to be regulated for operating the pilot control to thereby operate the power motor, a follow-up return means operated from the power motor co-acting with the responsive means in the operation of the pilot control element including a floating lever, mechanical means interconnecting said lever with said motor, means for adjusting the last named means including a fluid displacement device operated from the power motor, a fluid pressure motive device operatively connected with the follow-up adjusting means, a conduit connecting the displacement means with the motive means, a check valve in said conduit for preventing back flow from the motive device to the displacement device and a manually operated valve for by-passing fluid past said check valve.

5. In stabilizing means, for regulators of the class having a power motor and a pilot control element, comprising, in combination, means for operating the pilot control to thereby operate the power motor, a cam, a second cam superimposed on the first named cam, mechanical means operated from the power motor for revolving said second named cam on the periphery of the first named cam, means operated by said second named cam, co-acting with the pilot control operating means for governing the operation of the power motor, and fluid pressure means, operated from said power motor, and means controlled thereby for actuating the first named cam to thereby adjust the second named cam.

6. In stabilizing means, for regulators of the class having a power motor and a pilot control element, comprising, in combination, means responsive to the condition to be regulated, for operating the pilot control to thereby operate the power motor, a cam, a second cam superimposed on the first named cam, mechanical means operated from the power motor for moving said second named cam over the periphery of the first named cam, means operated by said second named cam, co-acting by means of a floating lever with the pilot control operating means for governing the operation of the power motor, fluid pressure means including a fluid displacement device operated from the power motor, and a fluid pressure motive device operated thereby, for actuating the first named cam to thereby adjust the second named cam.

7. In combination with a power motor, of a device adapted to control a source of energy for operating the power motor, an operating member for said control device, means connecting said control device and said operating member, a cam, a multiple step cam superimposed on the first named cam, means driven from the power motor, for moving said stepped cam over the periphery of the first named cam, means operated by said stepped cam, co-acting by means of a floating lever with the control device operating means, adapted to shift the control device from an effective to a non-effective position at each stepped position of the stepped cam, fluid pressure means including a fluid displacement device comprising a cylinder having a piston therein operated from the power motor, adapted to displace fluid under pressure at a given predetermined speed of the power motor, and a fluid pressure motive device operated by the displacement of said fluid and means controlled thereby for actuating the first named cam to adjust the stepped cam.

8. In a fluid system, a power motor and means controlled thereby, for controlling the condition of the fluid of the system, a pilot control element, having a neutral position in which the operation of the power motor is not effective, and an effective position for controlling a source of energy for operating the motor, governing means including a cam, a multiple step cam superimposed on the first named cam, means driven from the power motor for moving said stepped cam over the periphery of the first named cams, means operated by said stepped cam, co-acting by mechanical means with the control element adapted to shift the element from an effective to a non-effective position at each stepped position of the cam, fluid pressure means including a fluid pressure displacement device comprising a cylinder having a piston therein operated from the motor, adapted to displace fluid under pressure at a given predetermined speed of the power motor, and a fluid pressure motive device operated by the displacement of said fluid, and means operated thereby for actuating the first named cam to adjust the stepped cam to cause a greater or less variation in the condition of the system between the said steps of operation.

9. In stabilizing means, for regulators of the class having a power motor and a pilot control element adapted to control a source of energy for operating said motor, means responsive to the condition to be regulated, for operating the pilot control element to thereby operate the motor, a cam, a second cam superimposed on the first named cam, each having a common axis of rotation, means driven by the power motor, for moving said second named cam over the periphery of the first named cam, means operated by said second named cam, co-acting by mechanical means with the responsive means for governing the operation of the pilot control, and means operated by variations in speed of the power motor to adjust the first named cam to thereby adjust the second named cam, to cause a greater or less variation between the limits of operation of the power motor.

JAMES L. KIMBALL.

REFERENCES CITED

The following references are of record in the file of this patent:

UNITED STATES PATENTS

| Number    | Name    | Date          |
|-----------|---------|---------------|
| 2,102,007 | Kimball | Dec. 14, 1937 |
| 1,604,530 | Morrill | Oct. 26, 1926 |
| 1,612,818 | Howse   | Jan. 4, 1927  |
| 2,118,842 | Grebe   | May 31, 1938  |
| 2,227,170 | Ziebolz | Dec. 31, 1940 |

FOREIGN PATENTS

| Number | Country  | Date          |
|--------|----------|---------------|
| 83,091 | Austrian | Mar. 10, 1921 |